US008938609B2

(12) United States Patent  
Avadhanam

(10) Patent No.: US 8,938,609 B2  
(45) Date of Patent: Jan. 20, 2015

(54) METHODS AND APPARATUS FOR PRIORITY INITIALIZATION OF A SECOND PROCESSOR

(75) Inventor: Phani B. Avadhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 624 days.

(21) Appl. No.: 12/887,196

(22) Filed: Sep. 21, 2010

(65) Prior Publication Data

US 2011/0231640 A1 Sep. 22, 2011

Related U.S. Application Data

(60) Provisional application No. 61/261,133, filed on Nov. 13, 2009.

(51) Int. Cl.
*G06F 9/00* (2006.01)
*G06F 15/177* (2006.01)
*G06F 9/44* (2006.01)

(52) U.S. Cl.
CPC ............ *G06F 9/4403* (2013.01); *G06F 9/4405* (2013.01)
USPC .................................................. 713/2; 713/1

(58) Field of Classification Search
USPC ........................................................ 713/1, 2
See application file for complete search history.

(56) References Cited

U.S. PATENT DOCUMENTS

| 6,052,773 | A | 4/2000 | DeHon et al. |
| 6,158,000 | A * | 12/2000 | Collins .............................. 713/1 |
| 6,336,185 | B1 * | 1/2002 | Sargenti et al. .................... 713/2 |
| 6,339,819 | B1 | 1/2002 | Huppenthal et al. |
| 7,281,127 | B2 * | 10/2007 | Rothman et al. ................... 713/2 |
| 7,526,639 | B2 * | 4/2009 | Duron et al. ....................... 713/1 |
| 7,568,197 | B1 | 7/2009 | Kiick et al. |
| 7,600,109 | B2 * | 10/2009 | Ueltschey et al. ................ 713/2 |
| 7,882,341 | B2 * | 2/2011 | Rothman et al. ................... 713/1 |
| 2005/0223213 | A1 | 10/2005 | Poznanovic |
| 2006/0149959 | A1 * | 7/2006 | Rothman et al. ................... 713/2 |
| 2007/0192578 | A1 * | 8/2007 | Duron et al. ....................... 713/1 |
| 2008/0052504 | A1 * | 2/2008 | Tsuji et al. ........................ 713/1 |
| 2008/0148037 | A1 * | 6/2008 | Rothman et al. ................... 713/2 |
| 2009/0083528 | A1 * | 3/2009 | Li et al. ............................. 713/1 |
| 2009/0248920 | A1 | 10/2009 | Chaudhuri et al. |
| 2009/0265783 | A1 | 10/2009 | Huynh et al. |
| 2009/0327533 | A1 | 12/2009 | Kallam et al. |
| 2011/0231858 | A1 | 9/2011 | Sampathkumar et al. |

FOREIGN PATENT DOCUMENTS

| CN | 1525353 A | 9/2004 |
| CN | 101192165 A | 6/2008 |

OTHER PUBLICATIONS

Tina M. Redheendran, Booting DSP563XX Devices Through the Serial Communication Interface (SCI), Freescale Semiconductor, Rev.1, Aug. 2005.*

* cited by examiner

*Primary Examiner* — Zahid Choudhury

(74) *Attorney, Agent, or Firm* — Fulbright & Jaworski LLP

(57) ABSTRACT

Methods and systems provide for activating a second processor by a first processor in a dual processor device early within an initialization routine to enable the second processor to help complete initialization operations. The first processor may prepare a second processor chip for start up, configure the second chip's pins, program the second processor, download a firmware image on the second processor, and initiate operations on the second processor. By performing this initialization early within the initialization routine, the second processor can assist in the initialization routine.

28 Claims, 13 Drawing Sheets

_METHODS AND APPARATUS FOR PRIORITY INITIALIZATION OF A SECOND PROCESSOR_

RELATED APPLICATIONS

This application claims the benefit of priority to U.S. Provisional Patent Application No. 61/261,133 entitled "Burst Access Protocol and Priority Initialization of a Second Processor" filed Nov. 13, 2009, the entire contents of which are hereby incorporated by reference.

BACKGROUND

Many forms of electronic devices include a digital signal processor (DSP) in addition to a control processor. In a complex electronic device, such as smart phones and mobile television receivers, the start up process can be time consuming as many circuits and processes require activation and initialization. Long delays associated with starting an electronic device have been sources of user dissatisfaction with electronic devices. Thus there is a need for methods that can accelerate the power up and initialization process of electronic devices.

SUMMARY

The various embodiments include methods and systems for activating a second processor by a first processor early within an initialization routine. The embodiments may involve preparing a second chip for start up, configuring the second chip's pins, programming the second processor by the first processor, and downloading and running a firmware image on the second processor, wherein the second processor is activated early enough within the initialization routine to assist in the initialization routine.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
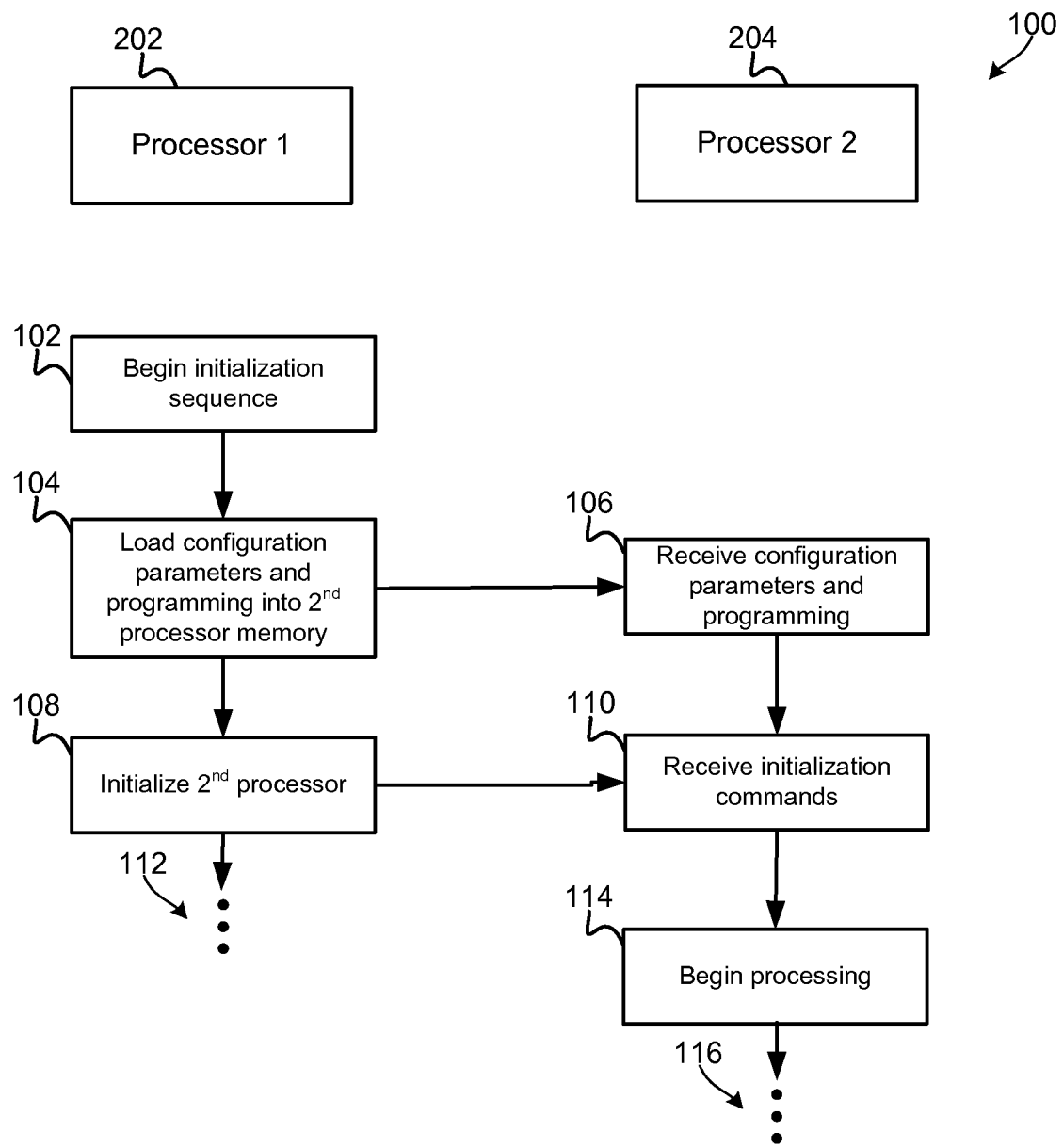
FIG. 1 is a process flow diagram of another embodiment method for programming and configuring a second processor at an early point within an initialization process managed by a first processor.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" refers to any one or all of cellular telephones, personal data assistants (PDA's), palm-top computers, lap-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a first programmable processor, a second programmable processor coupled to the first programmable processor via a data interface circuit. An example mobile device is a mobile TV broadcast receiver.

The various embodiments provide methods and systems for accelerating the initialization of electronic devices by programming a second processor, such as a DSP, early in the initialization process so that the second processor can contribute to start up operations otherwise performed by a first processor. An example useful for describing the various embodiments is forward link only television (FLO TV) receiver devices which are configured with a control processor and a DSP. Rather than the control processor performing all initialization tasks in series, the various embodiments enable the control processor to initialize the DSP at an early step, thereby making the DSP available to perform some of the initialization operations.

In an exemplary embodiment, the control processor (e.g., an ARM processor 704 described below with reference to FIG. 7) may be configured with processor-executable instructions to program, configure and initialize the second processor (e.g., a RDSP 704 described below with reference to FIG. 7) as one of the first operations in initializing device hardware. The embodiments enable the second processor to begin performing operations early in the initialization sequence. Providing a second processor operating during the initialization sequence can increase the number of operations that can be performed in a short amount of time and add additional functionality that can be leveraged during the initialization sequence. In an embodiment, the early initialization of the second processor may make use of a burst access protocol which is described below. Using the burst access protocol, the first processor may configure the second processor sufficiently to enable the second processor to receive a static table of commands and data as one of the first operations in the initialization sequence.

Conventionally, in applications where a first processor programs the second processor as part of an initialization sequence, the first processor typically configures all of the registers and programming of system hardware prior to finishing the programming and configuration of the second processor. Such a conventional approach enables the first processor to control all the configuration and initialization steps before the second processor begins operation. The various embodiments follow a different course, initializing the second processor early in the initialization processes so that it can perform some of the configuration and initialization steps that would otherwise have to be performed by the first processor.

FIG. 1 illustrates an example method 100 by with a first processor may initialize a second processor as an early operation within the initialization sequence. In method 100 at step 102, the first processor 502 begins the initialization sequence. At step 104, the first processor 502 loads registers associated with the second processor 504 and accomplishes any other programming of the second processor 504 to enable the second processor to begin operations. At step 106, the second processor receives such programming. At step 108, the first processor sends a command or other signal to the second processor to cause it to begin operations. At step 108, the second processor receives the activation command, and at step 114, the second processor begins operations according to its programming. The first processor may then continue with other initialization sequence processes 112, such as transmitting the static and dynamic tables of the burst access protocol to the second processor as described below with reference to FIG. 6. Similarly, the second processor may perform operations, such as receiving the static and dynamic tables of the burst access protocol as described above with reference to FIG. 6.

Figure 2A:
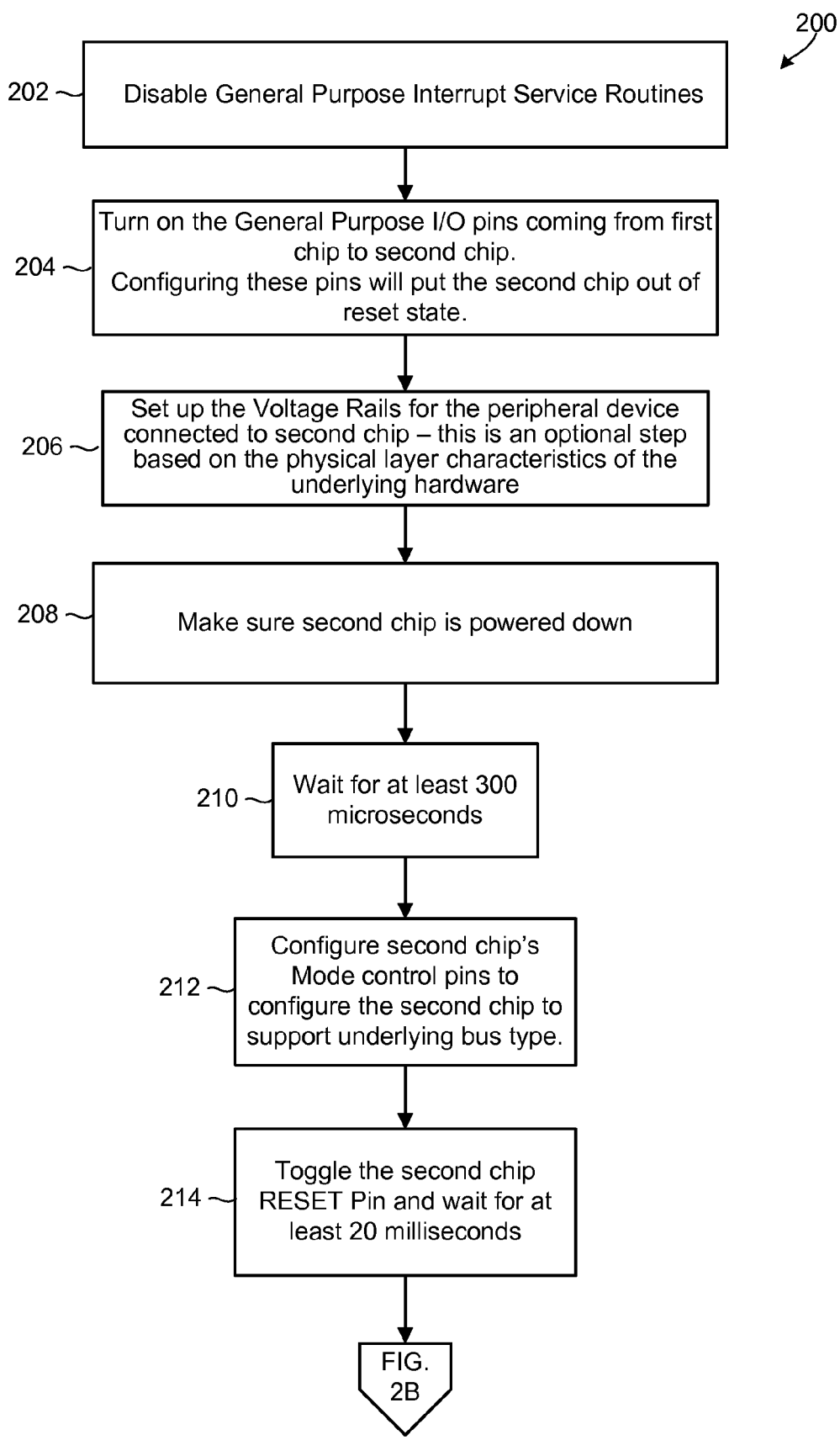
FIGS. 2A and 2B together are a process flow diagram of an example embodiment method for programming and configuring a digital signal processor within a second chip from a processor within a first chip.
Figure 2B:
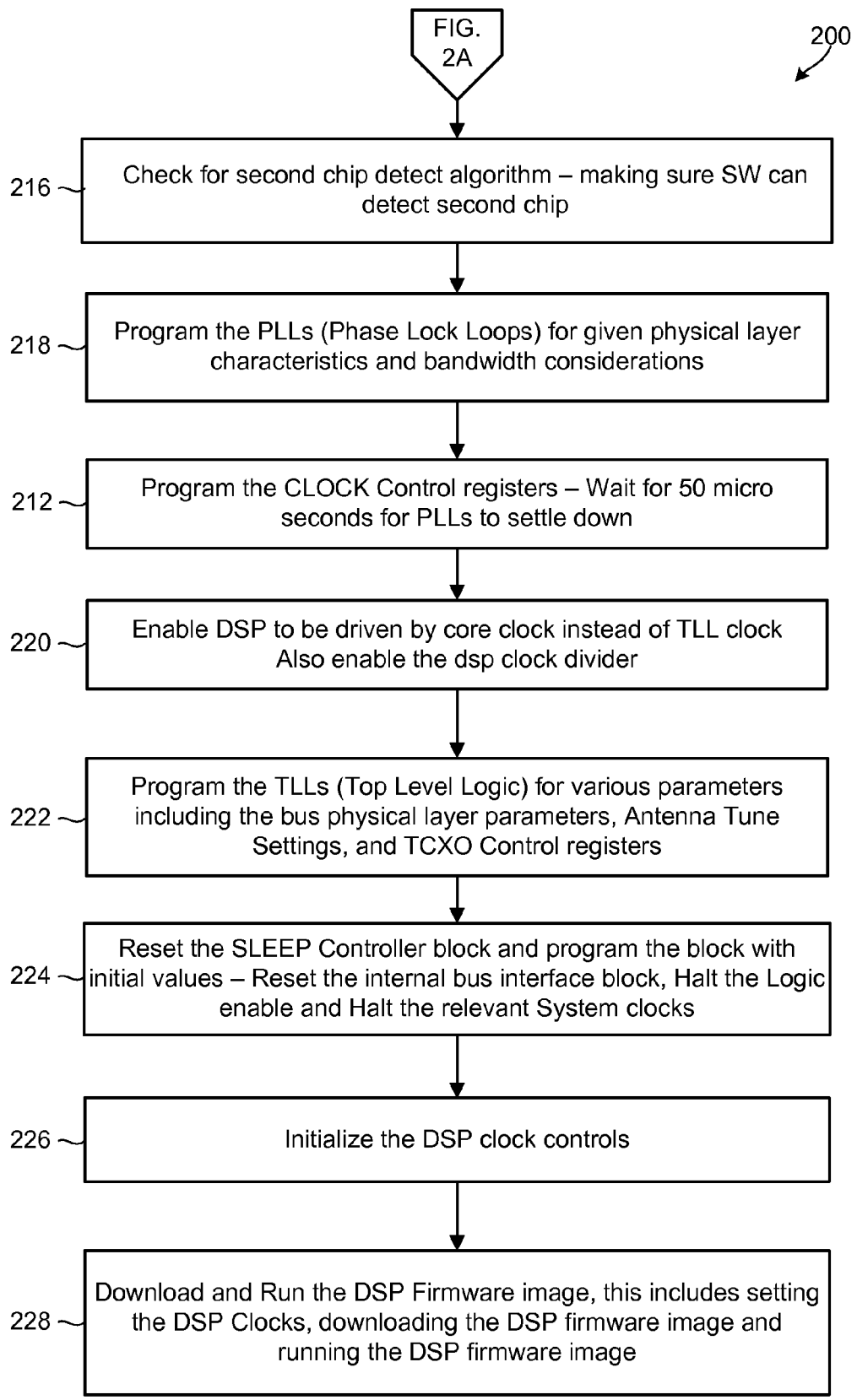

A general method 200 for activating a second processor as an early process within an initialization routine is illustrated in FIGS. 2A and 2B. In method 200 at step 202, a first processor on a first chip may disable the general purpose interrupt service routines of a second chip. At step 204, the first processor may turn on the general purpose input/output pins between the first chip and the second chip. Configuring these input/output pins takes the second chip out of the reset state. At step 206, the first processor may set up voltage rails for a peripheral device connected to the second chip. This step may be optional depending upon the physical layer characteristics of the underlying hardware. The first processor may test to confirm that the second chip is powered down in step 208, and wait for at least 300 μs in step 210. At step 212, the first processor may configure the second chip's mode control pins and thereby configure the second chip to support underlying bus types. The second chip may be configured to match the underlying bus type beneath the first and second chip. The bus type may be one of several different varieties, including EPI1, EPI2, or other industry standards. In step 214, the first processor may toggle the second chip's reset pin and wait for at least 20 ms for the reset to begin.

Referring to FIG. 2B, method 200 continues at step 216 in which the first processor may perform a second chip detection algorithm to confirm that the software can detect the second chip. In step 218, the first processor may program the phase locked loops (PLL) for given physical layer characteristics and bandwidth considerations. The first processor program the clock control registers and wait 50 μs for the PLLs to settle down in step 219. In step 220, the first processor may enable a DSP (i.e., the second processor) on the second chip to be driven by its core clock instead of the TLL clock. As part of this step 220, the first processor may also enable the DSP clock divider. In step 222, the first processor may program the top level logic (TLL) of the second processor with various parameters, including the bus physical layer parameters, antenna tune settings, and the temperature controlled crystal oscillator (TCXO) control registers. In step 224, the first processor may reset the sleep controller block, and program the block of the second chip with initial values. As part of this step 224, the first processor may also reset the internal bus interface block, halt the logic enable, and halt the relevant system clocks of the second processor. In step 226, the first processor may initialize the DSP clock controls. The first processor may enable a memory pool software clock control to be controlled through the DSP software. The first processor may also disable rxfront and sampsrv clocks on the second processor in this step 226. In step 228, the first processor may download the DSP firmware image to the second processor (e.g., a DSP) and initiate processing of the firmware on the second processor. This step may involve setting the DSP clocks, downloading the DSP firmware image, and activating the DSP firmware image.

Figure 3A:
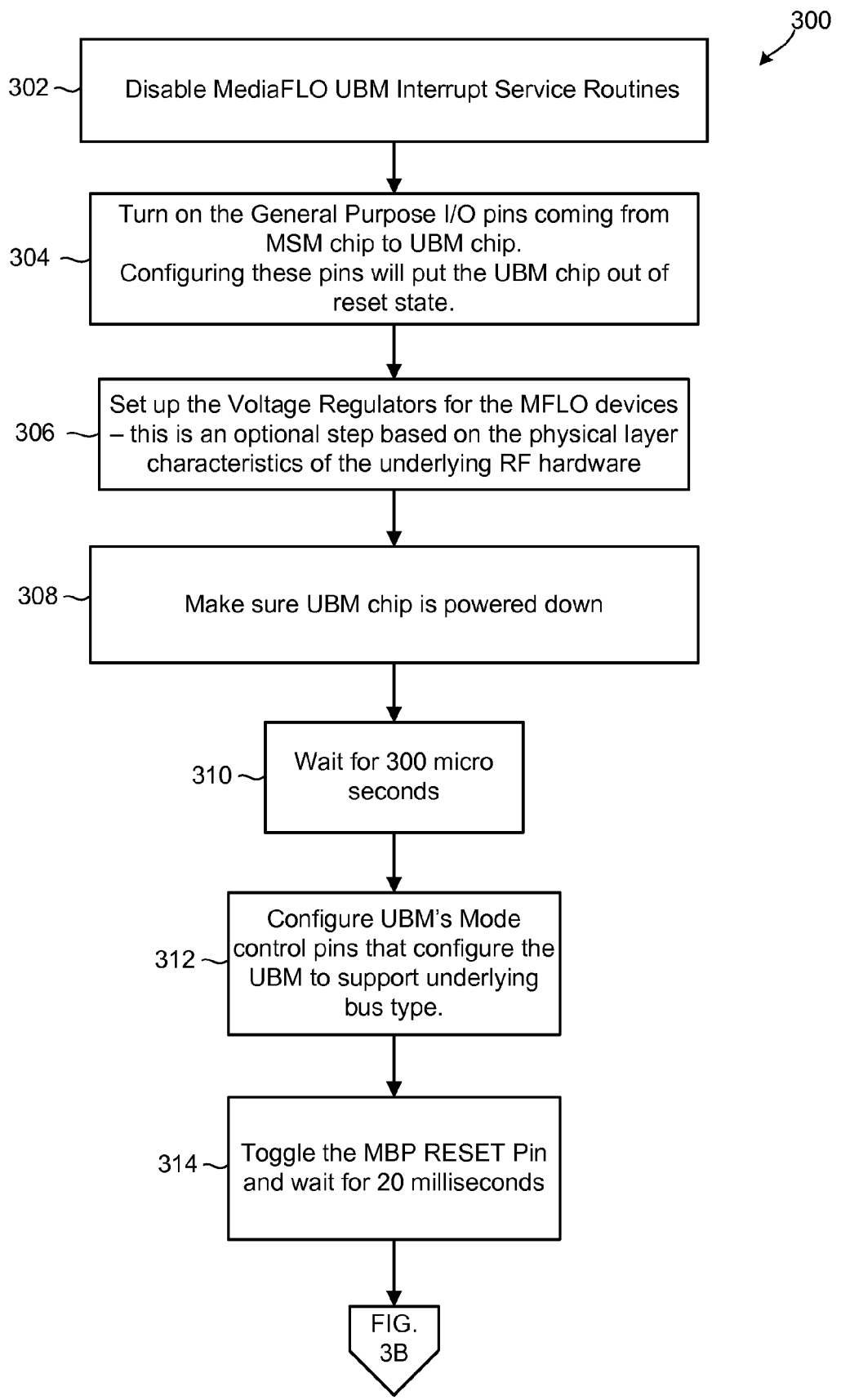
FIGS. 3A and 3B together are a process flow diagram of an example embodiment method for programming and configuring a digital signal processor within a multimedia receiver chip from a processor within a mobile station modem (MSM) chip.
Figure 3B:
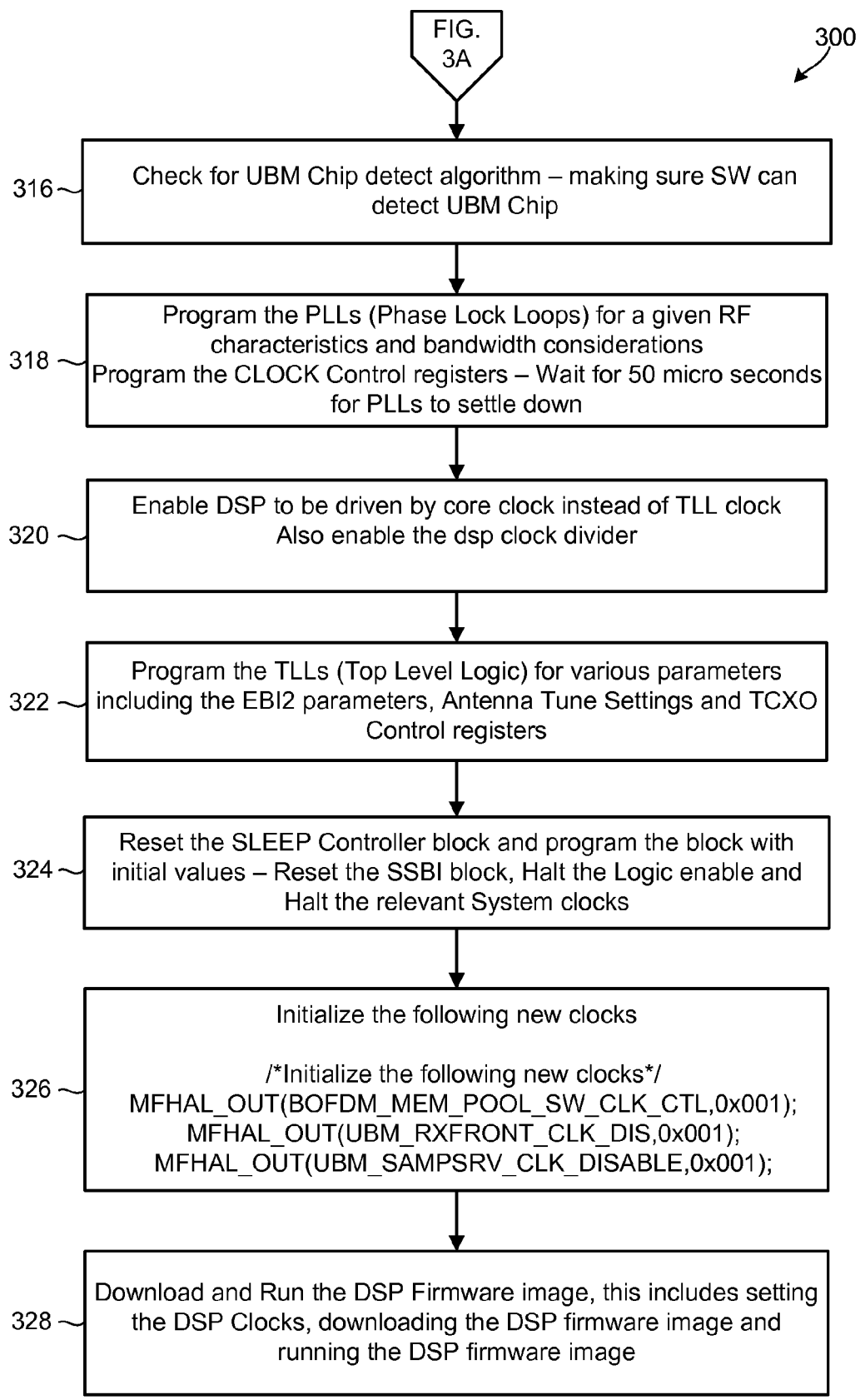

Methods for activating a second processor as an early process within an initialization routine may be further described by way of a particular example illustrated in FIGS. 3A and 3B. For MediaFLO chips used in FLO TV receiver devices, such as the UBM2 chip, the process of bringing up the chip's receiver digital signal processor (RDSP) processor at the earliest convenient time can provide operational benefits. This is primarily because various hardware programming tasks can be off loaded to the RDSP. Drivers for broadcast technologies like MediaFLO (e.g., DVBH) program the receiver hardware in a sequence block by block from the hardware. This block by block programming is intended to ensure that any inter-dependencies within the hardware are taken care of while programming the hardware. Conventional approaches for configuring hardware in the MediaFLO chips have programmed the RDSP at the last step of the Initialization Sequence. This conventional approach makes the RDSP available so late in the power up sequence that the functionality of the RDSP is not fully utilized. In some cases, activating the RDSP as a last step in the initialization sequence results in the processor missing time critical functions that could have been accomplished with the help of RDSP if that processor had been programmed earlier on.

There are a number of processes that the RDSP could support, such as TDM1, SPC, PPC, TPC, etc. An illustrative example of a process that the RDSP can support is the hardware initialization at power up. This process involves a "Catch 22" situation, in that the RDSP needs to be up and running before the Advanced reduced instruction set computer (RISC) Machine (ARM) processor within the Qualcomm Mobile Subscriber Modem (MSM) can download tables used in the burst access protocol described herein. However, for the power up case, the ARM processor needs to initialize the RDSP before it can transfer to the RDSP the static and dynamic tables of the burst access protocol. The conventional power up hardware initialization of the MFLO drivers enables a number of blocks and registers before the ARM processor downloads the RDSP firmware image. This conventional approach poses problems for burst access protocol when the static and dynamic tables are transferred via an SDIO interface.

This example embodiment provides a mechanism for fine tuning the necessary blocks and a special way of configuring them so that the RDSP can be programmed at the earliest possible time, enabling the RDSP to be initialized early and in an efficient manner. The following example identifies the hardware blocks that are needed, and a mechanism for programming these hardware blocks, providing for the necessary settling time, downloading the RDSP firmware image, and activating the RDSP.

Referring to FIG. 3A, in method 300 at step 302, the ARM processor may disable the MediaFLO UBM2 chip interrupt service routines. In step 304, the ARM processor may turn on the general purpose input/output pins between the MSM chip and the UBM2 chip. Configuring these input/output pins puts the UBM chip out of the reset state. In step 306, the ARM processor may set up the voltage regulators for the MediaFLO devices. This is an optional step based upon the physical layer characteristics of the underlying radio receiver hardware. In step 308, the ARM processor may test to confirm that the UBM2 chip is powered down, and wait 300 µs in step 310. In step 312, the ARM processor may configure the UBM2 mode control pins which configure the UBM2 to support underlying bus types. In step 314, the ARM processor may toggle the MBP reset pin and wait 20 ms.

Referring to FIG. 3B, method 300 continues in step 316 where the ARM processor may perform a UBM chip detection algorithm to confirm that the software can detect the UBM2 chip. In step 318, the ARM processor may program the phase locked loops (PLL) for given radio frequency characteristics and bandwidth considerations, and program the clock control registers. As part of this step, the ARM processor may also wait 50 µs for the PLLs to settle down. In step 320, the ARM processor may enable the RDSP to be driven by its core clock instead of the TLL clock. As part of this step, the ARM processor may also enable the RDSP clock divider. In step 322, the ARM processor may program the top level logic (TLL) with various parameters, including the EBI2 parameters, antenna tune settings, and the temperature controlled crystal oscillator (TCXO) control registers. In step 324, the ARM processor may reset the sleep controller block, and program the block with initial values. As part of this step, the ARM processor may also reset the SSBI block, halt the logic enable, and halt the relevant system clocks. In step 326, the ARM processor may initialize new clocks. In the example of the UBM2 chip, such new clocks may include: a
MFHAL_OUT(BOFDM_MEM_POOL_SW_CLK_CTL, 0x001);
MFHAL_OUT(UBM_RXFRONT_CLK_DIS, 0x001); and
MFHAL_OUT(UBM_SAMPSRV_CLK_DISABLE, 0x001).

In step 328, the ARM processor may download the RDSP firmware image to the RDSP and initiate processing of the firmware. This step may involve setting the RDSP clocks, downloading the DSP firmware image, and activating the DSP firmware image.

An example sequence code for accomplishing this programming is provided below.

```
static void mfrxd_init_hw ( )
{
  mfrxd.hw_state = MFRXD_HW_INITIALIZING;
  /* Make sure no ISR cannot be invoked */
  mfhal_set_flo_hw_isr_handler( mfextern_get_flo_int0_gpio( ),
    NULL );
  /* Make sure events are unmasked */
  mfrxd_enable_mfrxd_events( );
  /* UBM2 HW Initialization */
  /* Power Up, Reset sequence for UBM1 */
  mfhal_init_hw_platform( FALSE );
  /* Configure EBI2 */
  mfhal_init_hw_interface( pll_vals[mfconfig_data_ptr->bandwidth -
                  MFTYPES_BW_5_MHZ].ebi2_setting );
  /* Initialize MBP GPIOs */
  mfrxd_init_mbp_gpios( );
  if(! mfrxd_mbp_detect(FALSE))
  {
    /** MBP Chip is not detected -- there is no point in going further thru
    the HW Initialization process */
    mfrxd.hw_state = MFRXD_HW_UNINITIALIZED;
    return;
  }
  /* Program PLL */
  mfrxd_init_ubm_pll( );
  /* Program TLL */
  mfrxd_init_ubm_tll( );
  /* Initial wakeup of UBM */
  mfrxd_init_ubm_wakeup( );
  /**
   * Download the DSP ahead of the rest of the blocks for Burst
   * Access Protocol implementation
   */
  mfrxd_download_and_run_dsp_firmware( );
```

As mentioned above, in some implementations of the various embodiments, communications between the first processor and the second processor may make use of the burst access protocol, which is disclosed in U.S. patent application Ser. No. 12/887,206, entitled "Burst Access Protocol" filed contemporaneous with this application, the entire contents of which are hereby incorporated by reference. For example, when implemented on devices including an UBM2 chip and an RDSP, the burst access protocol can enable the priority initialization of the RDSP in an efficient manner. Since the RDSP resides alongside the FLO hardware on the UBM2 chip in the example FLO TV receiver device, the time required to program the FLO hardware from the RDSP does not pose an issue. Thus, the RDSP may be used to program the FLO hardware (e.g., store appropriate data within particular registers). However the values to be programmed into the hardware have to come from the ARM, since the ARM executes the FPS software which determines the values that need to be programmed into particular hardware registers. If the ARM was to transfer the complete information to the RDSP regarding the registers to be programmed along with the values to be programmed, such transfer operations would be prohibitively expensive because the ARM would end up sending more data to the RDSP than it would have done for programming the hardware registers directly. Hence the ARM-to-RDSP interface should allow for most of the information to be sent upfront (e.g., during power up, initialization or during a period of little activity) when there are no real-time constraints, and only send critical selection parameters to the RDSP when real time processing kicks in.

The physical layer system hardware registers typically must be reconfigured or reprogrammed from time to time due to factors such as fine tuning, field test results, discovery of hardware limitations, etc. The biggest bottleneck in completing such reconfigurations is the effort in rewriting firmware if any of the factors mentioned above change. In other words, a firmware implementation that hard codes the hardware registers to be programmed, the sequence to be used, and possibly the values to be programmed would require a rewrite of the code at a later date. These factors require an interface between the MSM and UBM chips that allows the ARM to generically notify the RDSP of what needs to be programmed, the sequence of programming that should be implemented, the indices of registers to be programmed, and the values to be programmed. Some hardware register writes/write sequences need to be followed up with an arbitrary delay before the next write is performed. Thus, a mechanism is needed to insert such delays between writes as required.

The burst access protocol provides mechanisms and systems for solving communication bottlenecks that may arise between integrated circuit elements within computing devices. The increasing speed and complexity of integrated circuit used in multimedia receivers, communication devices and computing devices has placed increasing demands upon the transmission of large amounts of data in real time among large components. In many cases, the bottleneck in data communication is due to the time required to set up a data transfer over any interfacing databus. For example, the Secure Digital input/output (SDIO) interface, which is used in many electronic devices such as cameras, GPS receivers, modems, Bluetooth adapters, radio tuners, and others that combine an SD card with an I/O device, can transfer large amounts of data in contiguous blocks, but requires a set up sequence that is not time-efficient for single data transfer operations. The relatively long access set up time of the SDIO interface means that the circuit may become a communication bottleneck in electronic devices that require real-time operations and data communications among various internal components. Thus, while the SDIO interface is affordable, well understood in the industry, and very efficient for moving large blocks of data, its relatively slow setup process makes it unsuitable for many integrated circuits that require real time read/write operations.

The burst access protocol provides a communication protocol that can overcome communication bottlenecks in data interface circuits (e.g., the SDIO interface). The burst access protocol enables integrated circuits implementing to take advantage of the large block writing efficiency of such data interface circuits while compensating for their slow single access characteristics. This is accomplished by configuring and transferring data, indices, and/or instructions from a first processor to a second processor in two data tables that the second processor can use to implement instructions specified by the first processor. A first table is a relatively static table that is referred to herein as a "static interface table" or simply as a "static table." The static table is used for transferring instructions, data, register indices, and set up parameters in a large block of data that can be transmitted in advance of being used by the second processor. A second table used for communicating instruction sequences and frequently changing data is referred to herein as a "dynamic interface table" or simply as a "dynamic table." The dynamic table is used for controlling the second processor by including information, such as individual or sequences of data tables within the static table that are to be implemented, along with dynamic data that the second processor can use as a guide for executing processes stored in the static table. By transmitting in advance most of the data, register indices, instructions, sequences and configuration data that may be implemented in the second processor in the static table, a data interface with a long setup time can be used efficiently by a first processor to control a second processor by reducing the number and frequency of data transfers over the interface.

The application of the burst access protocol to the various embodiments described above may facilitate the interface between a Qualcomm MediaFLO receiver chip, referred to as a UBM2 chip, and an MSM chip. In a new implementation, the UBM2 chip is coupled with an MSM chip using the SDIO interface. The SDIO interface can transmit large blocks of data very quickly; however, each data transfer requires set up processing that makes the interface unsuitable for frequent transmissions of real time instructions and data. To overcome these deficiencies, the burst access protocol may be implemented to permit the ARM processor within the MSM chip to configure and control the RDSP within the UBM2.

Figure 4:
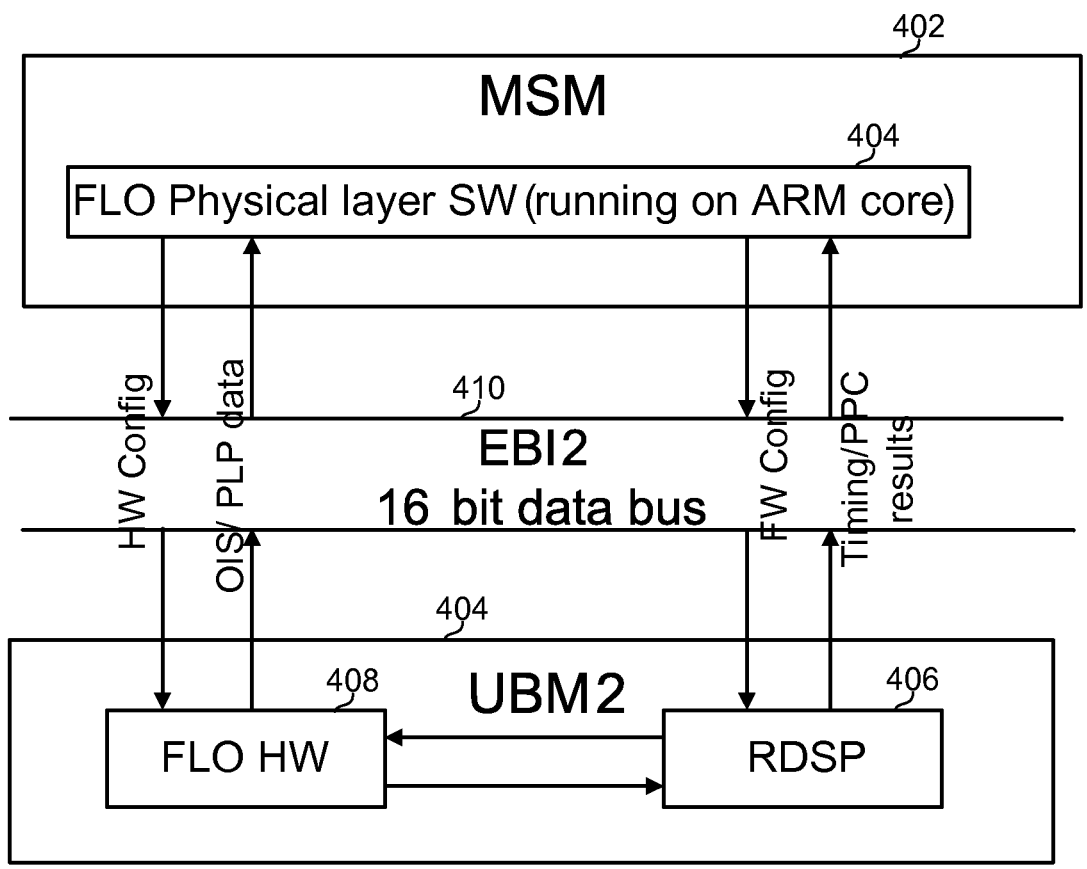
FIG. 4 is a hardware architecture diagram of a prior art data interface between a mobile subscriber modem and a mobile television receiver chip.

Interacting with the UBM2 chip from the FLO Protocol Stack (FPS) software running on the MSM involves several time critical transactions which have to be accomplished in the order of milliseconds or even sub-milliseconds. FIG. 4 illustrates a hardware architecture 400 that may be used for interfacing MSM chips 402 with UBM2 chips 404 using the EBI2 interface 410. In this prior architecture 400, an ARM core 404 within the MSM 402 executes the FLO physical layer software. The FLO physical layer software running on the ARM core 402 must configure the RDSP 406 with firmware instructions and the FLO hardware 408 with hardware configurations. In this architecture, the EBI2 interface was able to provide real time write transactions to enable the MSM and UBM2 chips to interface properly. The various embodiments may be implemented in this hardware architecture by the ARM core 402 configuring the RDSP 406 over the EBI2 interface 410.

New MSM chipsets use an SDIO interface instead of an EBI2 interface. The SDIO interface is an industry standard data exchange interface that supports two forms of data transfer, one being the single access and the other being the block or burst access. The disadvantage of the SDIO single access mode is that it takes a relatively long time to set up the data interface compared to that of other high speed interfaces, such as the EBI2. This long access time can be attributed to the setup time involved with the SDIO access. The burst access mode of the SDIO interface is much faster when compared to the single (i.e., byte) access mode, because it uses the hardware direct memory access (DMA) engine to do the actual transfer. Despite the long setup time, the data transfer is so fast that it can perform better than the EBI2 access for large data transfers. However, there is an inherent setup cost involved in using the DMA engine which can result in diminishing to negative returns for small transactions (i.e., data transfers). The problem with the FPS software is that, currently most of the hardware accesses, especially writes, are done to non-contiguous hardware registers. Access writes to non-contiguous registers over an SDIO interface resemble single access SDIO transactions. Given the relatively long time required to complete single access transactions, many real time requirements of the FPS would break.

Under such scenarios, one alternative would be to convert such random single transactions into burst transactions. But burst transactions require a contiguous memory space. Since the hardware registers to be programmed for any given scenario in an FPS software configuration do not present a contiguous memory map to software, the burst access protocol of the various embodiments is used to program these random lists into contiguous blocks that can be stored in the RDSP memory and that the RDSP can parse to write particular values to the appropriate hardware registers.

Figure 5:
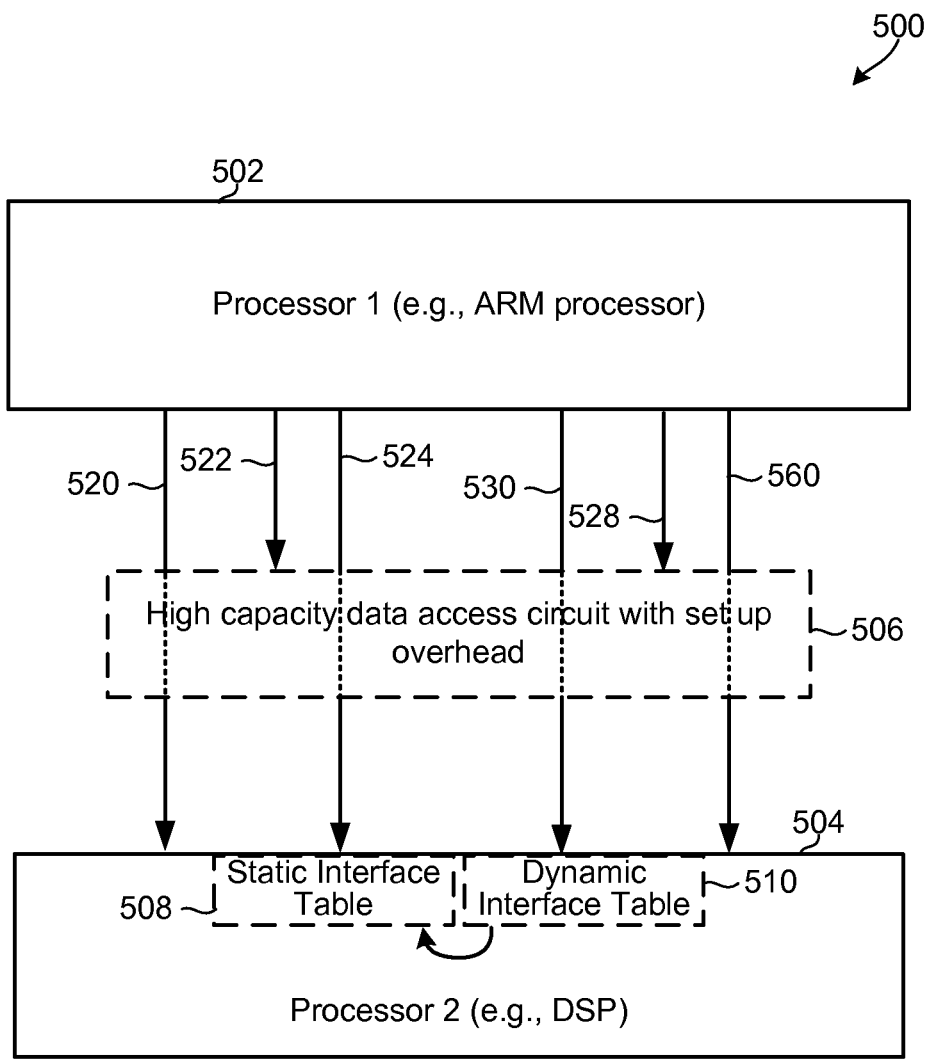
FIG. 5 is a hardware architecture diagram of two processors interfaced by a high capacity data interface that would present a communication bottleneck if all data accesses were performed in a single access mode.

FIG. 5 illustrates a hardware architecture 500 for use with the various embodiments using the burst access protocol. A hardware architecture 500 suitable for use with the burst access protocol will typically involve a first processor 502, such as an ARM processor or processor core, that communicates data and/or instructions to a second processor 504 via a high-capacity data access circuit 506 that features an access set up process which may present a communication bottleneck, such as an SDIO interface. In such an architecture, the first processor 502 may need to pass configuration data, such as hardware and firmware initialization and configuration data for program registers, to the second processor 504. The burst access protocol enables the first processor 502 to pass most of the required information regarding programming of the registers to the second processor 504 during initialization, and to pass only the minimum information thereafter when real-time considerations kick in. To enable this, initialization data and instructions may be transferred from the first processor 502 to the second processor 504 for storage in a static interface 508, and runtime parameters (e.g., instruction sequences and data only available at runtime) may be transferred from the first processor 502 to the second processor 504 for storage in a dynamic interface 510. The static interface 508 may allow the first processor 502 to send to the second processor 504 information regarding the hardware registers to be programmed, alternative programming sequences, and alternative possible sets of values to choose from for programming each hardware register.

FIG. 5 also illustrates communications between the first and second processors 502, 504 that are part of the burst access protocol. For example, the first processor 502 may communicate in signal 520 to processor 504 information (i.e., table parameters) regarding the table that is about to be transferred via the access circuit 506. For example, before transmitting the static table, the first processor 502 may send a signal 520 that informs the second processor 504 that the static table is about to be communicated as well as information that the second processor 504 requires to properly receive and store the table in memory, such as the length of the table. The table parameters signal 520 may be sent via the access circuit 506 or via a different circuit between the first and second processors. The first processor 502 may initialize the access circuit 506, as shown in arrow 522, and then transmit the static table in a single large data transfer 524. The second processor receives the static table and stores it within the static interface table portion of memory 508. Later, such as during runtime, the first processor 502 may perform a similar operation to transmit the dynamic table, by sending a signal 560 to the second processor 504 informing it that a dynamic table is about to be transmitted along with the table parameters required for reception and storage. The first processor 502 may configure the access circuit 506 (as indicated by arrow 528) and then transmit the dynamic table in message 530. The second processor 504 receives the dynamic table and stores it within the dynamic interface table portion of memory 510.

Figure 6:
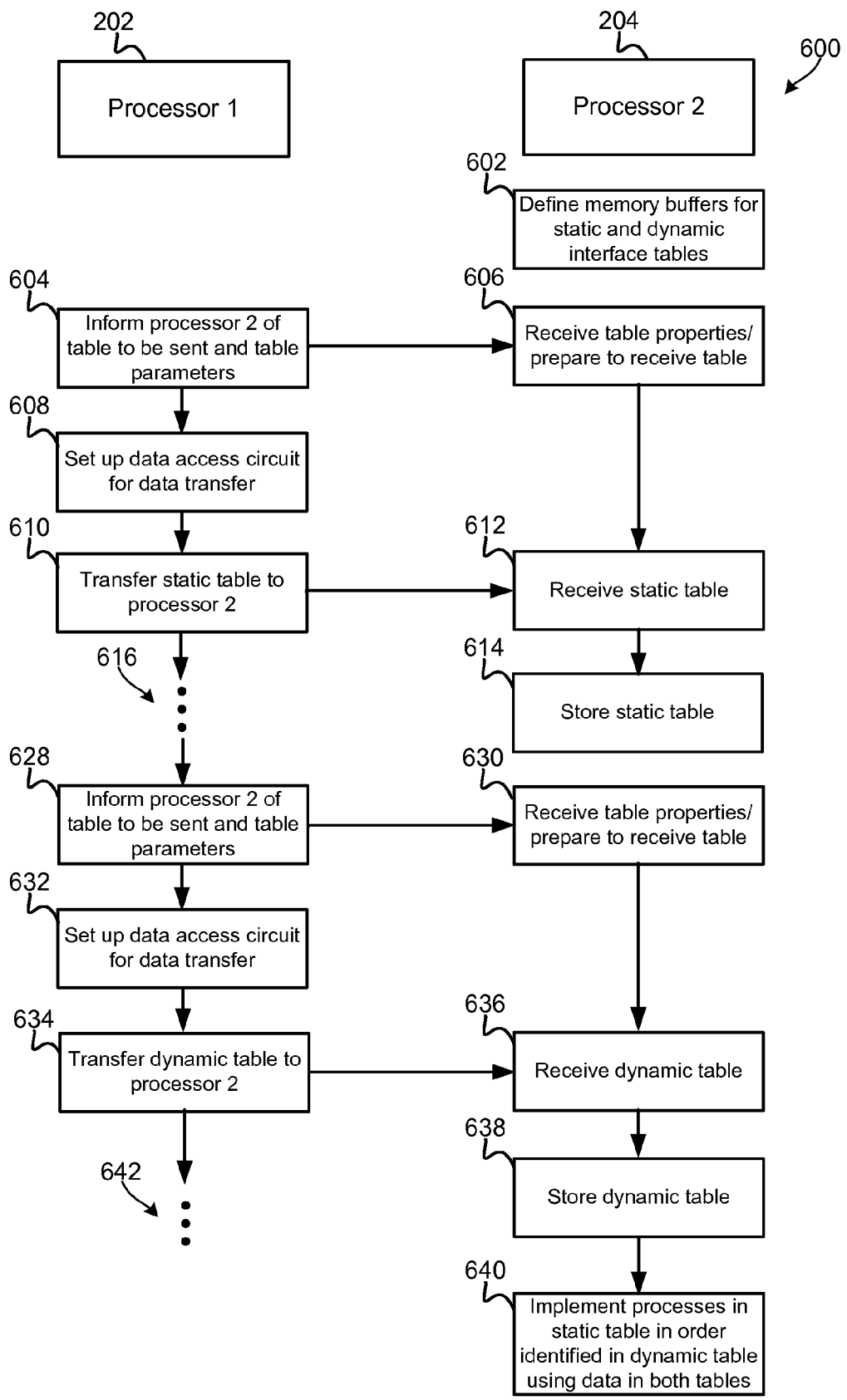
FIG. 6 is a process flow diagram of an embodiment method for communicating instructions and data between two processors using a burst access protocol according to the various embodiments.

FIG. 6 illustrates an example method 600 for implementing the burst access protocol between a first processor 502 and a second processor 504. If the second processor is not preconfigured for such an operation, an initiation process may define memory buffers for the static and dynamic interface tables at step 602. To program the second processor 504, or circuits or registers controlled by the second processor 504, the first processor 502 may inform the second processor that a static table is about to be sent along with the table's parameters in step 604. The second processor receives this information in step 606, and prepares to receive the static table. The first processor 504 may initiate the data write set up sequence to configure the access circuit for transferring the static table in step 608. Once the access circuit is set for transferring data, the first processor may initiate transfer of the static table to the second processor at step 610. The second processor 504 receives the static table in step 612, and stores the table in the static interface portion of memory coupled to the second processor in step 630. The first processor may conduct other operations 616 until such time that a run time configuration of the second processor 504, or circuits controlled by the second processor, needs to be accomplished. At that point, the first processor 502 may send a message to the second processor 504 informing it that a dynamic table is about to be transmitted, along with the table parameters required for receiving and storing of the data in step 628. The second processor 504 receives the table properties and prepares to receive the dynamic table in step 630. The first processor 502 sets up the data access circuit for transferring the dynamic table in step 632, and transfers the dynamic table to the second processor in step 634. The second processor 504 receives the dynamic table via the access circuit in step 636, and stores the dynamic table in the dynamic access portion of memory in step 638. In step 640, the second processor 504 implements the processes directed by the first processor by using information stored in the dynamic table to determine the sequences, data tables, or processes stored in the static table that should be executed, including the sequence in which multiple processes should be at executed, along with the data stored in the static table that should be used in the processes, such as to configure registers. Thus, the second processor 504 may be configured with software to use information stored in the dynamic table to perform operations and configure registers using information in the static table as if the first processor were transferring information to the second processor in a sequence of single access operations.

The burst access protocol may be implemented using a variety of interrupts and message resources that are shared between the first and second processors to support transferring data from one to the other. Such interrupts and shared resources will depend upon the status registers included within the first and second processors or the functional chips in which the first and second processors reside. To provide an example of such interrupts and shared resources, the following description refers to the MSM-to-UBM2 architecture 700 illustrated in FIG. 7.

Figure 7:
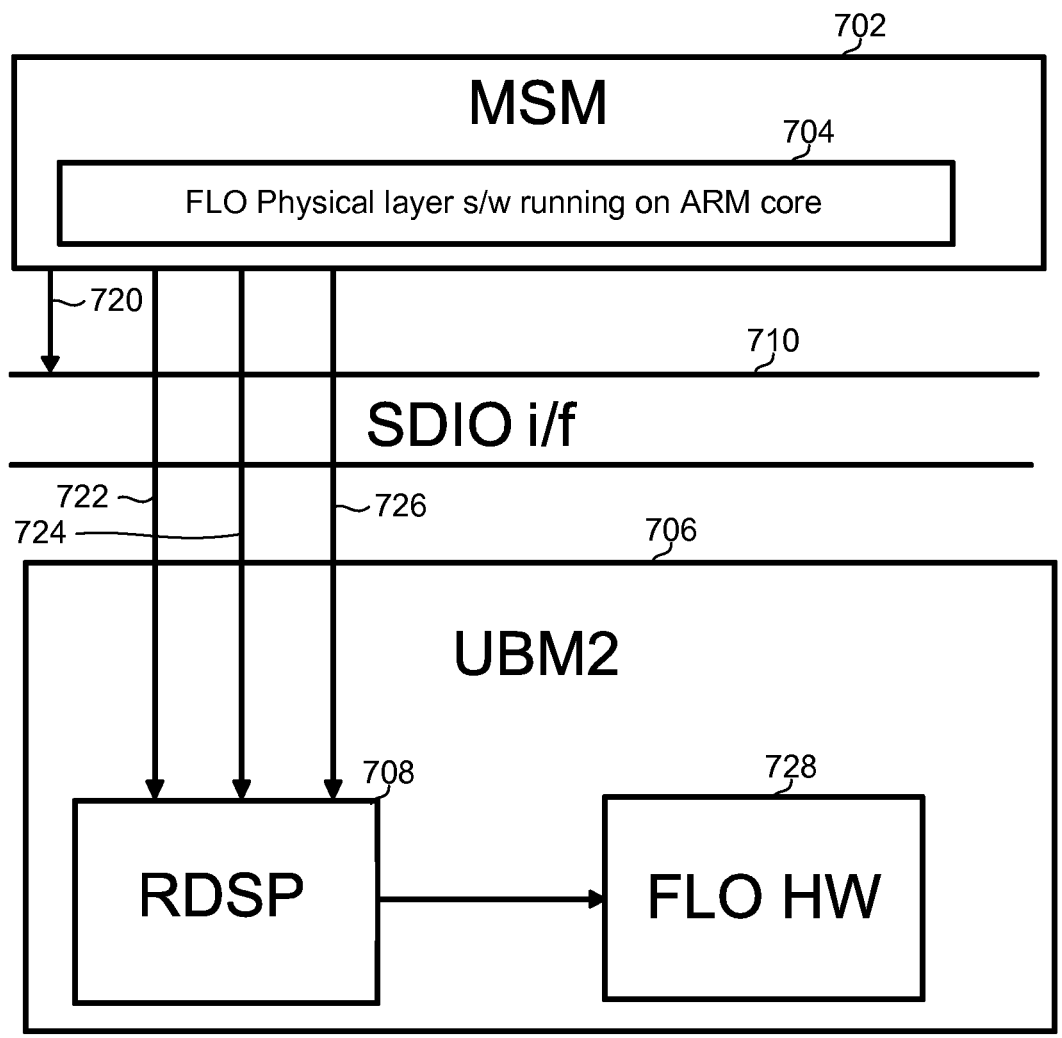
FIG. 7 is an example hardware architecture diagram of a data interface between a mobile subscriber modem and a UBM2 mobile television receiver chip implementing the burst access protocol of the various embodiments.

Referring to FIG. 7, the MSM-to-UBM2 architecture 700 includes an MSM chip 702 which features an ARM core 704 that operates the FLO physical layer software and sends configuration instructions to the RDSP 708 within the UBM2 via an SDIO interface 710. In this architecture, the ARM core 704 may configure the SDIO interface in message 720 using the bus access layer. In message 722, the ARM core 704 may configure the RDSP 708 and necessary RDSP dependencies. In message 724, the ARM core 704 may download the firmware and configuration parameters in the static table for storage within the RDSP memory. In message 726, the ARM core 704 may download the dynamic table providing the RDSP 708 with all of the necessary runtime parameters. The RDSP 708 may then run the firmware using the dynamic table to determine the information from the static table necessary to program the FLO hardware 728.

The UBM2 hardware 706 may include a dedicated bit in the interrupt status register to identify an interrupt fired by the RDSP 708. In this example architecture, the floSWCmd-Response RDSP register may be used to distinguish between various RDSP interrupts. Similarly, the RDSP driver, which is maintained on the ARM processor 704, may include a mechanism (on the ARM) to generate a software interrupt to the RDSP 708. The floSWCmd RDSP register may be used by the RDSP 708 to identify the type of interrupt fired by the ARM 704. The following table 1 describes ARM interface interrupts that may be implemented with the burst access protocol in the architecture illustrated in FIG. 7.

TABLE 1

RDSP - ARM Interface Interrupts

| Interrupt name | Fired By | Description |
|---|---|---|
| RDSP_to_micro_irq | RDSP | This interrupt is fired by RDSP to the ARM when it has completed all of its processing. When ARM receives this interrupt it reads the RDSP command response register (floSWCmdResponse) to determine which command was completed by the DSP. 0x107 - BAP request successful 0x108 - BAP request unsuccessful (Error code register specified in the interfaces) |
| micro_to_rDSP_cmd_irq | ARM | This interrupt is fired by ARM when it has a command ready for the RDSP to process. The command would be set by ARM in the floSWCommand register, which the RDSP would fetch to determine which command it needs to process. 0x2 - MFTYPES_RDSP_Process_BAP_CMD |

The static and dynamic interfaces of the burst access protocol enable the ARM 704 to transmit hardware writes to the RDSP 708 for programming of the UBM2 hardware using the burst access capabilities of the SDIO interface 710. In the example architecture illustrated in FIG. 7, the static interface may be an open buffer of length 2000 in MEMC (32 bit) RDSP memory, although larger or smaller buffers may be utilized. This memory may be packed by the ARM 708 with consecutive tables in a specific format. Each table may contain a list of hardware registers in sequence that are tied together by a common criteria that selects a specific value from a range of possible values for that given register, e.g., FFT-CP combinations. By formatting the programming data contained in the static access in this manner, a wide range of different configurations may be accommodated. Such criteria will support a wide range of values for each register. For example, 4kFFT-1/8CP might mandate that a certain hardware register should be programmed with a value X, whereas an 8KFFT-1/4CP might need a programming of value Y. The format of the tables may be described by the following C expression:

```
GenericBAPStaticTable
{
   NumRegisters,
   MaxIndex,
   HWRegisterAddress[NumRegisters],
   RegValuesArray[NumRegisters * MaxIndex]
}
```

If a given configuration scenario requires a certain set of hardware registers tied to a certain criteria (e.g., set1) to be programmed in a particular sequence followed by another (e.g., set2), and so on until setN, the static interface programming may be accomplished by packing and programming table1 followed by table2 and so on until tableN, and storing the tables in sequence within the static interface memory buffer. In such an implementation, the RDSP 708 would only need to be informed of the start address of the burst access protocol array and its total size. All information regarding the burst access protocol tables may be maintained by the ARM 704. Thus, a register interface for enabling the ARM 704 to program the burst access protocol static interface table may be those values listed in Table 2 below.

TABLE 2

DSP - ARM Register Interface for Static BAP Table Programming

| Register | Access Type | Bit Width | Contents |
|---|---|---|---|
| FLO_bapStaticTableArrayStartAddress | R | 32 | This register may specify the start address of the 32 bit static BAP array in the RDSP. |
| FLO_bapStaticTableArrayMaxSize | R | 32 | This register may specify the maximum length for the BAP static table allocated in the RDSP. |

Once the static tables are programmed into the RDSP 708 using the static interface, the bulk of the information transfer is complete. Before initiating a burst access protocol transaction, the software executing within the ARM 704 may determine the appropriate set of values to be programmed into hardware of the UBM2 706. Since the various possible data sets already exist in the static table within the RDSP memory, the ARM 704 only needs to inform the RDSP 708 of which indexes to use in each table within the static interface table. Since the number of tables within the static interface table programmed by ARM 704 is dynamic (i.e., the ARM 704 can specify as many tables as necessary in the static interface as long as the tables fit within the 2000 long memory allocation provided by the RDSP 708), the number of indices to be provided to access the static tables may be dynamic as well. Thus, the burst access protocol provides a very flexible programming capability. As a practical consideration the dynamic interface may be designed to allow up to 50 indices, although this number can be changed as needed.

An example format of the dynamic interface suitable for use with the architecture illustrated in FIG. 7 is described in the following C expression:

```
BAPDynamicInterfacePacket
{
  FLO_bapTransactionNumTables,
  FLO_bapTransactionTableOffsetsArray
  [FLO_bapTransactionMaxNumTables],
  FLO_bapTransactionStaticTableIndicesArray
  [FLO_bapTransactionMaxNumTables]
  // Where FLO_bapTransactionMaxNumTables is defined as 20
}
```

While the ARM 704 can fill any existing static table address offsets to the FLO_bapTransactionTableOffsetsArray locations, one new reserved table offset may be introduced to address the configurable delays required between hardware writes. The ARM 704 can use this special offset to indicate to the firmware that it requires special delay processing. When using this special offset, the corresponding index value set in FLO_bapTransactionStaticTableIndicesArray may indicate the delay value.

A register interface for enabling the ARM 704 to program the burst access protocol static dynamic table may be those values listed in Table 3 below.

TABLE 3

DSP - Arm register interface for dynamic BAP programming

| Register | Access Type | Bit Width | Contents |
|---|---|---|---|
| FLO_bapTransactionMaxNumTables | RW | 16 | This register specifies the maximum number of tables that can be programmed in one BAP transaction |
| FLO_bapTransactionNumTables | RW | 16 | This register will be used to specify the number of tables to be programmed by the RDSP (to the UBM HW) in a given BAP transaction. Reset to 0 on completion of a BAP transaction |
| FLO_bapTransactionTableOffsetsArray | RW | 16 | This 16 bit array will contain offsets to each of the tables (from the static table start address) to be programmed in a given BAP transaction (FLO_bapTransactionNumTables) Reset to 0 on completion of a BAP transaction |
| FLO_bapTransactionStaticTableIndicesArray | RW | 16 | This 16 bit array will contain an index for each corresponding table entry in the FLO_bapTransactionTableOffsetsArray Reset to 0 on completion of a BAP transaction |

Steps that may be taken to make use of the burst access protocol for programming burst non-conducive hardware registers may involve the following. As part of the configuration or initialization process for the second processor, memory may need to be allocated for the static and dynamic interfaces, and registers for the first processor to access interface locations may need to be declared and exported. Additional software command codes may be required for the first processor to use to interrupt the second processor and notify it of pending hardware writes for the burst access protocol. Command parsing logic may be added to detect burst access protocol commands and invoke the burst access protocol based hardware programming module. Top level burst access protocol parsing logic may be added that can parse the burst access protocol dynamic interface packet and invoke hardware programmer logic for each table. Generic hardware programmer logic may be added that can program hardware registers generically given a pointer to a static table (e.g., a table within the static interface table) and an index to use for that table. Task completion logic may be added that can fire the appropriate interrupt to the first processor upon completion of programming in the second processor. Test framework may be added to test and debug the generic programmer. Logging support may be added if needed to capture the algorithm sequence and/or results.

The following provides an outline of steps that a software developer could take to implement a burst access protocol. A software developer may identify a list of registers, sequence of programming, and values to program. The developer may create tables based on the information gathered from the system team that conform to the static interface. The developer may also identify programming sequences in existing software-hardware interactions, where the hardware programming through the second processor needs to be accomplished. Logic may be added to an application to determine the index to be used to select the appropriate values in each table based on different operating modes and any other criteria that form the indices into the tables. The developer may interlace required time delays using the reserved table offset along with the delay values as indices and pack the computed indices into the dynamic interface as described above. The command code in the second processor server software command interface register (e.g., FLO_floSWCommand) may be set to fire an interrupt to the second processor to initiate hardware programming. The developer may handle burst access protocol programming completion interrupts back from the second processor when it is done programming the hardware and continue the sequence to be followed after hardware programming. Logging support may be added to the application as needed.

Figure 8:
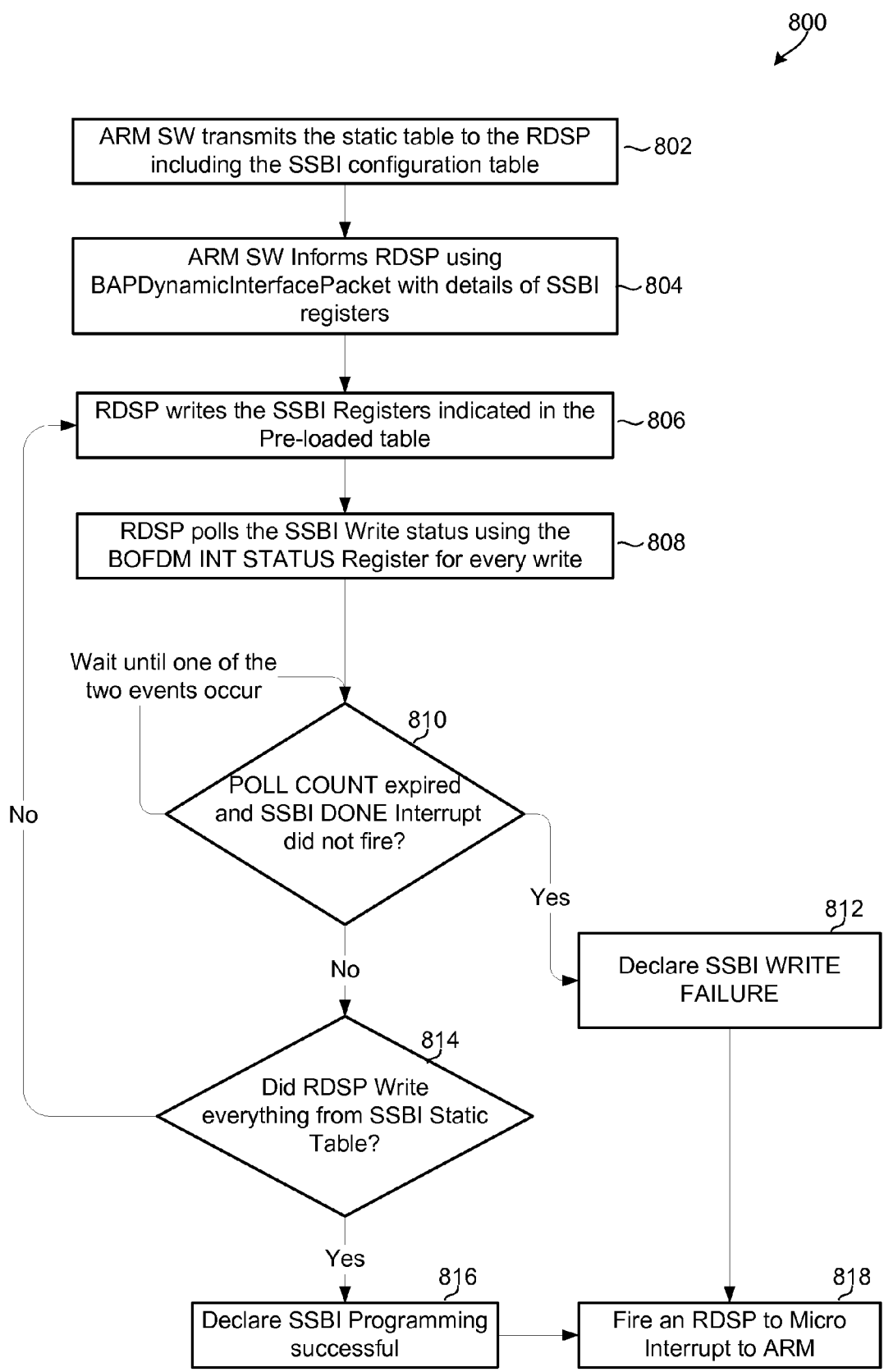
FIG. 8 is a process flow diagram of an embodiment method for writing data from a first processor to a second processor using the burst access protocol of the various embodiments.

FIG. 8 illustrates an example method 800 for the ARM 704 to program the RDSP 708 to configure single wire serial bus interface (SSBI) registers. In method 800 at step 802, the ARM 704 software may transmit the static table to the RDSP 704 including the SSBI configuration table. In step 804, the ARM 704 may inform the RDSP 704 using a burst access protocol dynamic interface packet about the details of the SSBI configuration table. In step 806, the RDSP 704 may use the information in the static table to write data into the SSBI registers. In step 808, the RDSP may poll an SSBI write status register for every write operation. In determination step 810, the RDSP may determine whether the poll count has expired and the SSBI DONE interrupt has not fired. If these conditions are met (i.e., determination step 810="YES"), this indicates a writing failure, so the RDSP may declare an SSBI write failure event at step 812, and send an interrupt to the ARM 704 in step 818. If the tested conditions are not met (i.e., determination step 810="NO"), the RDSP 704 may determine whether the RDSP has written every value from the SSBI static table into the SSBI registers in determination step 814. If the RDSP 704 has not yet written everything from the SSBI static table (i.e., determination step 814="NO"), the RDSP 704 may continue the process of writing the SSBI registers indicated in the preloaded tables by returning to step 806. Once the RDSP has written everything from the SSBI static table into the SSBI registers (i.e., determination step 814="YES"), the RDSP may declare a SSBI programming successful condition at step 816, and send an interrupt to the ARM 704 in step 818.

Figure 9:
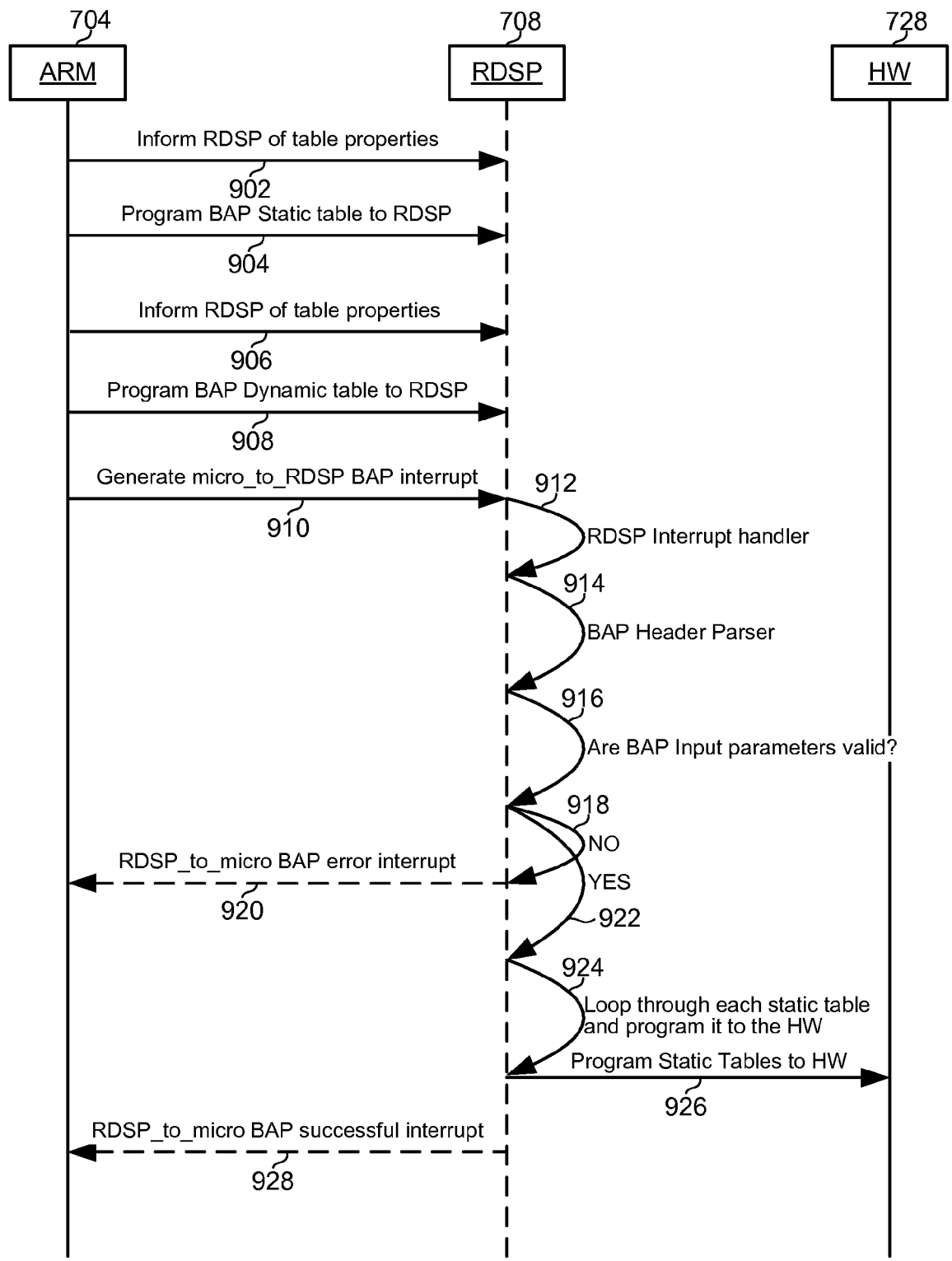
FIG. 9 is a call flow diagram showing communications and processes that may be implemented in the example hardware architecture illustrated in FIG. 4 using the burst access protocol of the various embodiments.

FIG. 9 illustrates an example of call flows that may be implemented in the architecture illustrated in FIG. 7 using the burst access protocol. The ARM 704 may send a message 902 to the RDSP 704 informing it of the properties of a static table that is about to be transmitted. In message 904, the ARM 704 may download the static table to the RDSP 704 which stores the table in the static interface buffer portion of memory. At a later point in time, such as during a runtime event, the ARM 704 may send message 906 to the RDSP 704 informing it that the dynamic table is about to be transmitted, including table properties required for the RDSP to receive the dynamic table. Thereafter, the ARM 704 may download the dynamic table to the RDSP 704 in message 908. Once the dynamic table has been downloaded to the RDSP 704, the ARM 704 may generate an interrupt 910 to the RDSP 704 to cause it to implement the programming defined in the dynamic and static interface tables. The RDSP 704 may respond to this interrupt by an appropriate RDSP interrupt handler 912. The RDSP 704 may then implement a burst access protocol header parser 914, and determine whether the burst access protocol input parameters are valid in processes 916. If the burst access protocol parameters are invalid, process 918 may generate an error interrupt 920 that is transmitted to the ARM 704. If the burst access protocol parameters are determined to be valid, process 922 may initiate an operations loop 924 that loops through different data structures of the static table according to the sequence defined in the dynamic table to program data stored in the static table into indicated registers of the FLO hardware 428 in a series of write operations 926. Once this programming has been completed, the RDSP 704 may send an interrupt 928 to the ARM 704 to inform it that the programming has been successful.

Figure 10:
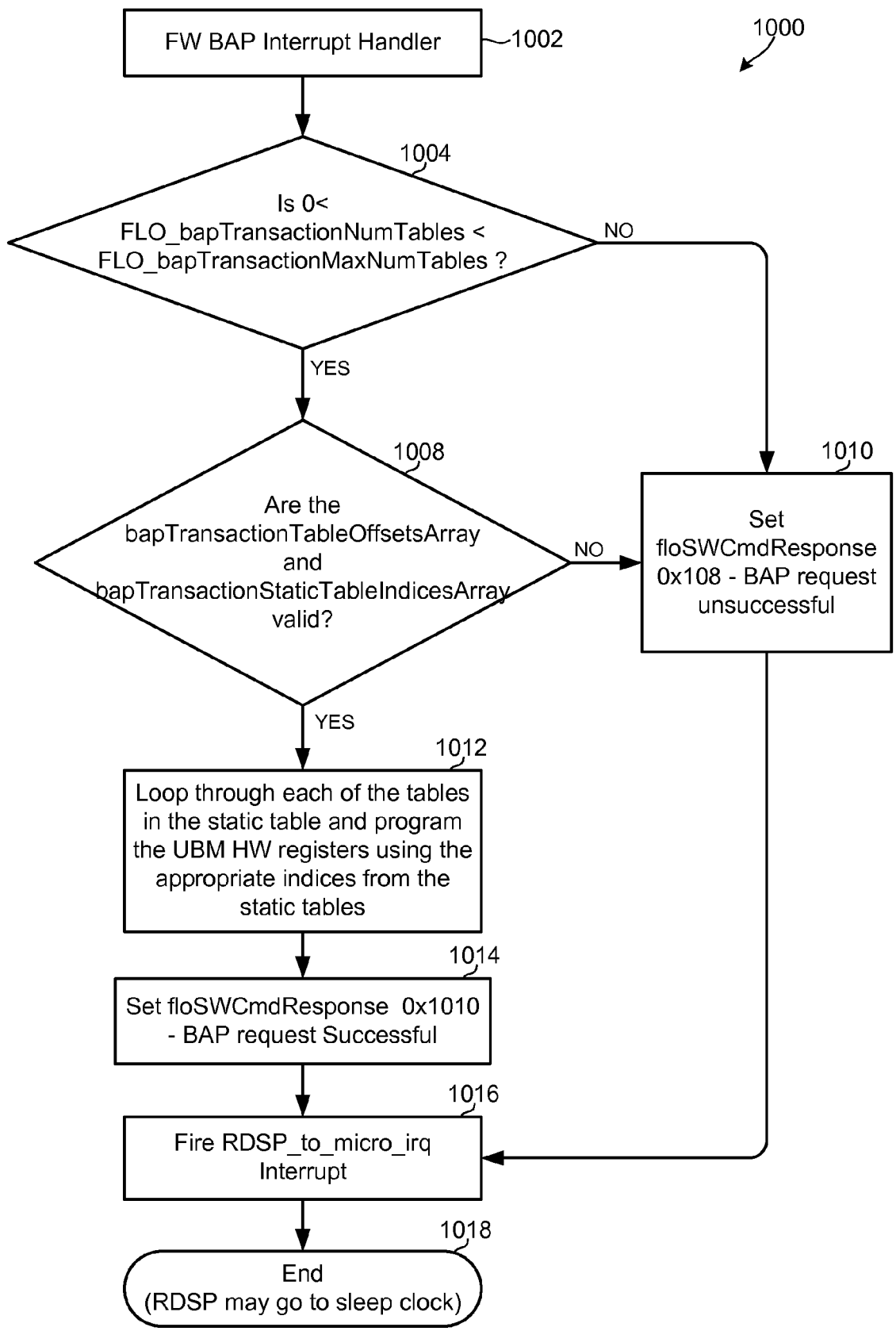
FIG. 10 is a process flow diagram illustrating a method for handling error messages associated with a data table write access using the burst access protocol of the various embodiments.

FIG. 10 illustrates an example method 1000 that may be implemented in the architecture illustrated in FIG. 4 for programming FLO hardware 428 using the burst access protocol. When the RDSP 704 receives an interrupt 910 from the ARM 704 informing it that the dynamic table has been downloaded and the programming operation can begin in step 1002, the RDSP 704 may determine whether the number of tables within the static interface is within the acceptable parameters, such as greater than zero and less than a maximum number in determination step 1004. If the number of tables within the static interface is outside the acceptable parameters (i.e., determination step 1004="NO"), the RDSP 704 may store a value to a register or variable (e.g., the "floSWCmd-Response" value) that indicates that the burst access protocol request was unsuccessful in step 1010. When the value indicating an unsuccessful request is stored in the appropriate register or variable, the RDSP 704 may fire an interrupt at step 1016 to inform the ARM 704 that it should check the success/failure register or value, before ending the process in step 1018.

If the number of tables within the static interface is within the acceptable parameters (i.e., determination step 1004="YES"), the RDSP 704 may determine whether the static table offsets and static table indices contained within the dynamic interface are valid in determination step 1008. If either of the table offsets or table indices are invalid (i.e., determination step 1008="NO"), the RDSP 704 may store a value to a register or variable (e.g., the "floSWCmd-Response" value) that indicates that the burst access protocol request was unsuccessful in step 1010. When the value indicating an unsuccessful request is stored in the appropriate register or variable, the RDSP 704 may fire an interrupt in step 1016 to inform the ARM 704 that it should check the success/failure register or value, before ending the process in step 1018.

If the table offsets and table indices are valid (i.e., determination step 1008="YES"), the RDSP may execute the processes of step 1012 to loop through each of the indicated tables in the static table and program the hardware 428 registers using the appropriate indices and data specified in the static table. Once all of the hardware registers have been properly program in step 1012, the RDSP 704 may store a value to a register or variable (e.g., the "floSWCmd-Response" value) that indicates that the burst access protocol request was successful in step 1014. When the value indicating that the request has been successfully completed is stored in the appropriate register or variable, the RDSP 704 may fire an interrupt in step 1016 to inform the ARM 704 that it should check the success/failure register or value, before ending the process in step 1018.

It should be appreciated that the embodiments of configuring the second processor as an early operation within an initialization sequence is not limited to the burst access protocol. While the burst access protocol may be useful in some implementations of the various embodiments, the embodiments may also be useful in electronic devices in which the bus between the two processors supports rapid data transfers (e.g., an EBI2 interface), or when second processor can perform other operations. Another use case for the various embodiment is where the UBM chip can be leveraged to use its RDSP to outsource other functionality. This additional functionality that can be out sourced may or may not be related to MediaFLO operations.

Figure 11:
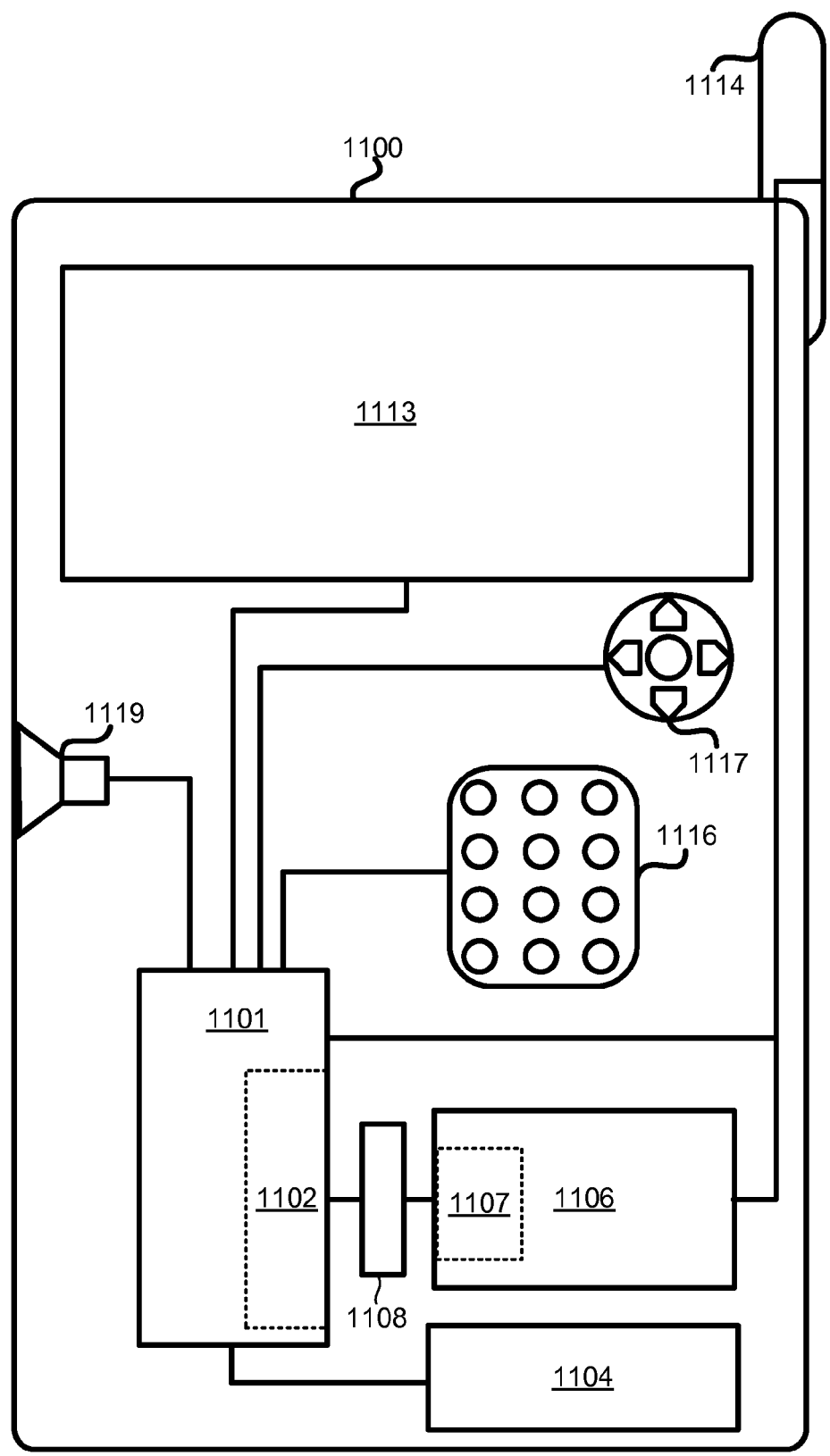
FIG. 11 is a component block diagram of a mobile device suitable for use in an embodiment.

The various embodiments may be used in a variety of electronic devices, an example of one such device is a Media FLO mobile receiver 1100 illustrated in FIG. 11. For example, a Media FLO mobile receiver 1100 may include a MSM chip 1101 that includes a first processor 1102 (e.g., an ARM processor 704) coupled to internal memory 1104. A Media FLO mobile receiver 1100 may further include a mobile broadcast receiver 1106, which includes a second processor 1107 (e.g., an RDSP 704). The first processor 1102 and the second processor 1107 may connected to a data interface 1108, such as an SDIO access bus. Additionally, the Media FLO mobile receiver 1100 may have an antenna 1114 for sending and receiving electromagnetic radiation that is connected to the MSM 1101 and to the mobile broadcast receiver 1106. The MSM 1101 may be coupled to a display 1103 for displaying video images, and to a speaker 1119 for generating sound. A Media FLO mobile receiver 1100 may also include a key pad 1116 or miniature keyboard and menu selection buttons or rocker switches 1117 for receiving user inputs.

The processors 1102, 1107 may be any programmable microprocessor, microcomputer or multiple processor chip or chips that can be configured by software instructions (applications) to perform a variety of functions, including the functions of the various embodiments described herein. In some mobile devices, multiple processors 1102, 1107 may be provided, such as one processor dedicated to wireless communication functions and one processor dedicated to running other applications. Typically, software applications may be stored in the internal memory 1104 before they are accessed and loaded into the processor 1102, 1107. In some implementations, the processors 1102, 1107 may include internal memory sufficient to store the application software instructions and data tables (e.g., the static and dynamic interface tables). For the purposes of this description, a general reference to memory refers to all memory accessible by the processors 1102, 1107, including internal memory 1104, removable memory plugged into the device or server (not shown), and memory within the processors 1102, 1107 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a non-transitory computer-readable medium. Non-transitory computer-readable media includes any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable readable medium and/or non-transitory computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for activating a second processor by a first processor within an initialization routine, comprising:
   preparing a second chip for operation, the second chip comprising the second processor;
   configuring the second chip's pins;
   programming the second processor by the first processor; and
   downloading and running a firmware image on the second processor,
   wherein the second processor is activated early enough within the initialization routine to assist in the initialization routine;
   wherein preparing the second chip comprises:
      disabling interrupt service routines of the second chip;
      turning on the general purpose input/output pins between the first chip and the second chip; and
      making sure the second chip is powered down.

2. The method of claim 1, wherein preparing the second chip further comprises:
waiting for at least 300 microseconds.

3. The method of claim 1, wherein preparing the second chip further comprises:
setting up voltage rails for a peripheral device connected to the second chip.

4. The method of claim 1, wherein configuring the second chip's pins comprises:
configuring the second chip's mode control pins;
toggling the second chip's reset pin; and
waiting for at least 20 milliseconds.

5. The method of claim 1, wherein programming the second processor by the first processor comprises:
performing a second chip detection algorithm;
programming phase locked loops;
programming clock control registers;
enabling the second processor to be driven by a core clock;
programming the top level logic;
resetting and programming a sleep controller block with initial values; and
initializing second processor clock controls.

6. A method for activating a second processor by a first processor within an initialization routine, comprising:
preparing a second chip for operation, the second chip comprising the second processor;
configuring the second chip's pins;
programming the second processor by the first processor; and
downloading and running a firmware image on the second processor,
wherein the second processor is activated early enough within the initialization routine to assist in the initialization routine,
wherein configuring the second chip's pins comprises:
configuring the second chip's mode control pins;
toggling the second chip's reset pin; and
waiting for at least 20 milliseconds, and
wherein programming the second processor by the first processor comprises:
performing a second chip detection algorithm;
programming phase locked loops;
programming clock control registers;
enabling the second processor to be driven by a core clock;
programming the top level logic;
resetting and programming a sleep controller block with initial values; and
initializing second processor clock controls.

7. The method of claim 1, wherein the second processor is a DSP, the second chip is a receiver chip, and the first chip is a modem chip.

8. An electronic device, comprising:
a first processor; and
a second processor coupled to the first processor, wherein the first and second processors are configured with processor-executable instructions to perform operations comprising:
preparing a second chip for operation, the second chip comprising the second processor;
configuring the second chip's pins;
programming the second processor by the first processor;
downloading and running a firmware image on the second processor;
disabling interrupt service routines of the second chip;
turning on the general purpose input/output pins between the first chip and the second chip; and
making sure the second chip is powered down,
wherein the second processor is activated early enough within an initialization routine to assist in the initialization routine.

9. The electronic device of claim 8, wherein the first and second processors are further configured with processor-executable instructions to perform operations such that preparing a second chip comprises:
waiting for at least 300 microseconds.

10. The electronic device of claim 8, wherein the first and second processors are configured with processor-executable instructions to perform operations such that preparing a second chip further comprises:
setting up voltage rails for a peripheral device connected to the second chip.

11. The electronic device of claim 8, wherein the first and second processors are configured with processor-executable instructions to perform operations such that configuring the second chip's pins comprises:
configuring the second chip's mode control pins;
toggling the second chip's reset pin; and
waiting for at least 20 milliseconds.

12. The electronic device of claim 8, wherein the first and second processors are configured with processor-executable instructions to perform operations such that programming the second processor by the first processor comprises:
performing a second chip detection algorithm;
programming phase locked loops;
programming clock control registers;
enabling the second processor to be driven by a core clock;
programming the top level logic;
resetting and programming a sleep controller block with initial values; and
initializing second processor clock controls.

13. An electronic device, comprising:
a first processor; and
a second processor coupled to the first processor, wherein the first and second processors are configured with processor-executable instructions to perform operations comprising:
preparing a second chip for operation, the second chip comprising the second processor;
configuring the second chip's pins;
programming the second processor by the first processor; and
downloading and running a firmware image on the second processor;
wherein the second processor is activated early enough within an initialization routine to assist in the initialization routine,
wherein configuring the second chip's pins comprises:
configuring the second chip's mode control pins;
toggling the second chip's reset pin; and
waiting for at least 20 milliseconds, and
wherein programming the second processor by the first processor comprises:
performing a second chip detection algorithm;
programming phase locked loops;
programming clock control registers;
enabling the second processor to be driven by a core clock;
programming the top level logic;
resetting and programming a sleep controller block with initial values; and
initializing second processor clock controls.

14. The electronic device of claim 8, wherein the second processor is a DSP, the second chip is a receiver chip, and the first chip is a modem chip.

15. A non-transitory processor-readable storage medium having stored thereon processor-executable instructions configured to cause a first processor and a second processor within a single electronic device to perform operations comprising:
 preparing a second chip for operation, the second chip comprising the second processor;
 configuring the second chip's pins;
 programming the second processor by the first processor;
 downloading and running a firmware image on the second processor;
 disabling interrupt service routines of the second chip;
 turning on the general purpose input/output pins between the first chip and the second chip; and
 making sure the second chip is powered down,
 wherein the second processor is activated early enough within an initialization routine to assist in the initialization routine.

16. The non-transitory processor-readable storage medium of claim 15, wherein the stored processor-executable instructions are configured to cause a first processor and a second processor within a single electronic device to perform operations such that preparing a second chip further comprises:
 waiting for at least 300 microseconds.

17. The non-transitory processor-readable storage medium of claim 15, wherein the stored processor-executable instructions are configured to cause a first processor and a second processor within a single electronic device to perform operations such that preparing a second chip further comprises:
 setting up voltage rails for a peripheral device connected to the second chip.

18. The non-transitory processor-readable storage medium of claim 15, wherein the stored processor-executable instructions are configured to cause a first processor and a second processor within a single electronic device to perform operations such that configuring the second chip's pins comprises:
 configuring the second chip's mode control pins;
 toggling the second chip's reset pin; and
 waiting for at least 20 milliseconds.

19. The non-transitory processor-readable storage medium of claim 15 wherein the stored processor-executable instructions are configured to cause a first processor and a second processor within a single electronic device to perform operations such that programming the second processor by the first processor comprises:
 performing a second chip detection algorithm;
 programming phase locked loops;
 programming clock control registers;
 enabling the second processor to be driven by a core clock;
 programming the top level logic;
 resetting and programming a sleep controller block with initial values; and
 initializing second processor clock controls.

20. The non-transitory processor-readable storage medium of claim 15 wherein the second processor is a DSP, the second chip is a receiver chip, and the first chip is a modem chip.

21. A non-transitory processor-readable storage medium having stored thereon processor-executable instructions configured to cause a first processor and a second processor within a single electronic device to perform operations comprising:
 preparing a second chip for operation, the second chip comprising the second processor;
 configuring the second chip's pins;
 programming the second processor by the first processor;
 downloading and running a firmware image on the second processor,
 wherein the second processor is activated early enough within an initialization routine to assist in the initialization routine,
 wherein configuring the second chip's pins comprises:
  configuring the second chip's mode control pins;
  toggling the second chip's reset pin further comprises; and
  waiting for at least 20 milliseconds, and
 wherein programming the second processor by the first processor comprises:
  performing a second chip detection algorithm;
  programming phase locked loops;
  programming clock control registers;
  enabling the second processor to be driven by a core clock;
  programming the top level logic;
  resetting and programming a sleep controller block with initial values; and
  initializing second processor clock controls.

22. An electronic device, comprising:
 a first processor;
 a second processor coupled to the first processor;
 means for preparing a second chip for operation, the second chip comprising the second processor;
 means for configuring the second chip's pins;
 means for programming the second processor by the first processor;
 means for downloading and running a firmware image on the second processor,
 means for disabling interrupt service routines of the second chip;
 means for turning on the general purpose input/output pins between the first chip and the second chip; and
 means for making sure the second chip is powered down,
 wherein the second processor is activated early enough within an initialization routine to assist in the initialization routine.

23. The electronic device of claim 22, wherein means for preparing the second chip comprises:
 means for waiting for at least 300 microseconds.

24. The electronic device of claim 22, wherein means for preparing a second chip further comprises:
 means for setting up voltage rails for a peripheral device connected to the second chip.

25. The electronic device of claim 22, wherein means for configuring the second chip's pins comprises:
 means for configuring the second chip's mode control pins;
 means for toggling the second chip's reset pin further comprises; and
 means for waiting for at least 20 milliseconds.

26. The electronic device of claim 22, wherein means for programming the second processor by the first processor comprises:
 means for performing a second chip detection algorithm;
 means for programming phase locked loops;
 means for programming clock control registers;
 means for enabling the second processor to be driven by a core clock;
 means for programming the top level logic;
 means for resetting and programming a sleep controller block with initial values; and
 means for initializing second processor clock controls.

27. The electronic device of claim 22, wherein the second processor is a DSP, the second chip is a receiver chip, and the first chip is a modem chip.

28. An electronic device, comprising:
 a first processor;
 a second processor coupled to the first processor;
 means for preparing a second chip for operation, the second chip comprising the second processor;
 means for configuring the second chip's pins;
 means for programming the second processor by the first processor;
 means for downloading and running a firmware image on the second processor,
 wherein the second processor is activated early enough within an initialization routine to assist in the initialization routine,
 wherein means for configuring the second chip's pins comprises:
  means for configuring the second chip's mode control pins;
 means for toggling the second chip's reset pin further comprises:
  means for waiting for at least 20 milliseconds, and
  wherein means for programming the second processor by the first processor comprises:
   means for performing a second chip detection algorithm;
   means for programming phase locked loops;
   means for programming clock control registers;
   means for enabling the second processor to be driven by a core clock; and
   means for programming the top level logic; means for resetting and programming a sleep controller block with initial values; and means for initializing second processor clock controls.

\* \* \* \* \*